United States Patent [19]

Fisher

[11] Patent Number: 4,539,675
[45] Date of Patent: Sep. 3, 1985

[54] ECHO CANCELLER

[75] Inventor: David A. Fisher, Saffron Walden, England

[73] Assignee: International Standard Electric Corporation, New York, N.Y.

[21] Appl. No.: 522,378

[22] PCT Filed: Nov. 18, 1982

[86] PCT No.: PCT/GB82/00329
§ 371 Date: Jul. 15, 1983
§ 102(e) Date: Jul. 15, 1983

[87] PCT Pub. No.: WO83/01876
PCT Pub. Date: May 26, 1983

[30] Foreign Application Priority Data
Nov. 19, 1981 [GB] United Kingdom ............... 8134898

[51] Int. Cl.³ .............................................. H04B 3/20
[52] U.S. Cl. .................................... 370/32; 370/24; 179/170.2; 179/170.8
[58] Field of Search ........................... 370/32, 24, 27; 179/170.2, 170.4, 170.6, 170.8; 375/12, 14

[56] References Cited

U.S. PATENT DOCUMENTS 4,117,277 9/1978 van den Elzen et al. ....... 179/170.6

FOREIGN PATENT DOCUMENTS 56-17532 2/1981 Japan ............................... 179/170.2

OTHER PUBLICATIONS

Nielsen, P. Tolstrup, "A Digital Hybrid for Two-Wire Digital Subscriber Loops", 1978 National Telecommunications Conference, vol. 2, Dec. 3-6, 1978.
di Tria, P. et al., "Design and Simulation of a Digital DPSK Modem for 80 Kbit/S Full-Duplex Data Transmission on the Subscriber Loop", 1981, International Conference on Communications, Conference Record, vol. 2.
Monsen, Peter, "Feedback Equalization for Fading Dispersive Channels", IEEE Transactions on Information Theory, Jan. 1971, pp. 56-64.

Primary Examiner—Robert L. Griffin
Assistant Examiner—Timothy K. Greer
Attorney, Agent, or Firm—John T. O'Halloran; Jeffrey P. Morris

[57] ABSTRACT

There is disclosed a communications system in which digital information is conveyed over a line and each station on the line has a hybrid circuit. The invention includes an apparatus having means for cancelling an unwanted echo signal between receive and transmit channels at each station. An analog to digital converter in the receive channel has a control input to receive a timing signal. A subtractor circuit has a first input coupled to the output of the digital to analog converter through a filter and receives signals from a canceller sample and hold circuit having an input coupled to the transmission port. The adaptive echo simulator is a transversal filter which has varying coefficient capability and which coefficients are varied by means of multiplexers included in coefficient generators. Thus the coefficient generators will provide coefficient outputs at given delays to enable the echo cancelling function to track the sytem response to produce a continuous signal whereby the unwanted signal is substantially removed as compared to operation of typical prior art echo cancellers.

13 Claims, 9 Drawing Figures

ECHO CANCELLER

This invention relates to a digital transmission system in which digital data information such as PCM is conveyed in either one of two directions over a single transmission path.

In such a system the stations at the end of the transmission path each have a GO and RETURN path, these paths being coupled to the transmission path via a hybrid or its electronic equivalent. The transmission path may be a two-wire twisted-pair which would normally be one of a number of such pairs in a cable. Unfortunately imperfections in the hybrid or its equivalent cause an unwanted signal to find its way from the GO to the RETURN path, and it is an object of this invention to provide for a substantial reduction in or elimination of this unwanted signal.

According to the present invention there is provided a digital transmission station for use in a system in which digital information such as PCM is conveyed in either one of two directions over a single transmission path, wherein the station includes GO and RETURN paths coupled to the transmission path via a hybrid or its equivalent, wherein in the RETURN path the received information is applied to an analog-to-digital converter which produces one output per received symbol which output has a digital format and represents the signal value at a specific sampling instant, wherein said output is applied via a digital filter of response $(1-Z^{-1})$ to one input of a subtractor circuit, the information thus applied to said one input of the subtractor circuit including, due to imperfections in the hybrid or its equivalent, an unwanted signal, and wherein a sample and hold circuit receives its input from the GO path and its output is applied via an echo simulator to another input of the subtractor circuit, so that the latter subtracts from the information in the return path a version of the signal in the GO path, whereby the output from the subtractor is a version of a received signal from which the unwanted signal has been substantially removed.

Thus this arrangement involves the use of digital signal processing techniques to achieve full duplex transmission of digital information, in the present case PCM, on a single pair of a multiple twisted-pair cable, in particular 144 kbt/s on exchange to subscriber loops. To simplify the system, the processing operations are performed at the line symbol rate and to minimize both near-end and far-end cross-talk, and also noise sensitivity, the non-linear process of decision feedback equilization (DFE) is used.

Embodiments of the invention will now be described with reference to the accompanying drawings, in which FIG. 1 is a digital transmission station embodying the invention.

Figure 1:
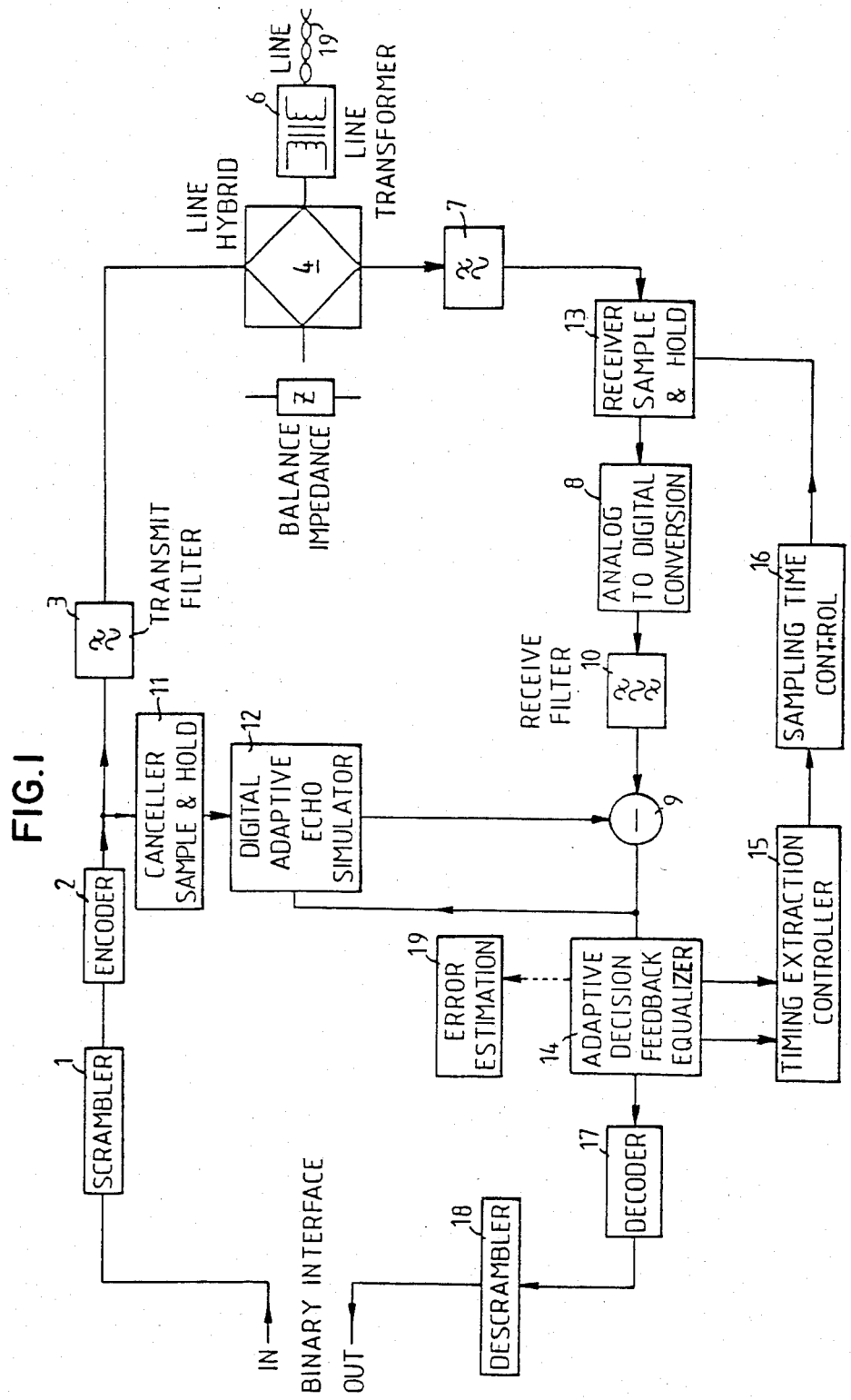

In a system using the present invention there are two ends, the master end being the one with a master oscillator which controls the PCM transmission rate, the other or slave end being synchronized to the master end by a clock synchronization circuit. The two ends differ because of the clock extraction and sampling time adjustment needs, but the system operates at each end substantially as will be described with reference to FIG. 1, which shows schematically the component parts of one end of the echo cancelling transmission system.

The binary data to be transmitted in the GO (IN) path is initially scrambled by a scrambler 1 to eliminate autocorrelation in the transmitted data and correlation between in the two directions of transmission. In a binary system, the encoder 2 to which the output of the scrambler 1 is applied is a differential encoder. This gives a binary output at the same rate as the input, such that the output changes when the input is 1 and does not change when the input is 0. The encoded information is applied to a transmit filter 3 to reduce high frequency energy sent to the cable at frequencies greater than half the symbol rate. This filter can be a first order low pass filter with 3 dB attenuation at the system's bit rate. The line hybrid 4 couples the output from the filter 3, which is the transmit signal, to the line, and presents a resistive impedance to the line of 140 ohms.

On the RETURN (OUT) side there is a filter 7 which precedes an analog-to-digital converter 8, which filter limits the spectrum of the received data to the half bit rate. It can be a third order Butterworth filter with attenuation of $-6$ dB at the half digit rate. The converter converts the signal from the line into a form more suitable for processing in the rest of the RETURN path.

The received signal comprises the wanted far end signal, plus unwanted local signal due to the imperfect loss of the hybrid 4. The impulse response from the GO path to the echo canceller subtractor 9 is referred to as the trans-hybrid impulse response. The output of the converter 8 is applied to a digital filter 10 whose parameters depend on the way timing extraction is implemented, but in a simple case the filter 10 has the response $1-Z^{-1}$.

The GO and RETURN paths are coupled by a canceller sample and hold circuit 11 and a digital adaptive echo simulator 12. This simulator is an adaptive transversal filter which adjusts automatically to match the transhybrid impulse response until the difference signal from the subtractor 9 has substantially no local signal content. It generates one output for each sampled input value from the receiver sample and hold circuit 13. The simulator 12 operates on the data to be sent, which is gated into it according to the method of timing extraction. Note the output from the subtractor 9 to the simulator 12.

The output from the subtractor 9 is also applied to an adaptive decision feedback equalizer (ADFE) 14, whose purpose is to detect the received symbol values and to remove inter-symbol interference (ISI) between received symbols due to the transmission through the cable. The equalizer also controls the timing due to its constant estimation of the channel impulse response, see below. This ADFE can be similar in principle to that of our Application No. 8032249 (D. A. Fisher 2). The output of this ADFE is applied to a timing extraction controller 15, which via a sampling time control circuit 16 controls the sample and hold circuit 13.

The output of the ADFE 14 is also applied to a decoder 17, which is in effect the inverse of the encoder 2, the output from which passes to a descrambler 18 the output of which is the RETURN (OUT) signal output. Also associated with the decoder 17 is an error estimation circuit 19.

In considering the line codes used, a distinction is drawn between the number of levels seen at the receiving detector point, and a two level system will be described, followed by an indication of the modification needed for a three level system.

Figure 2:
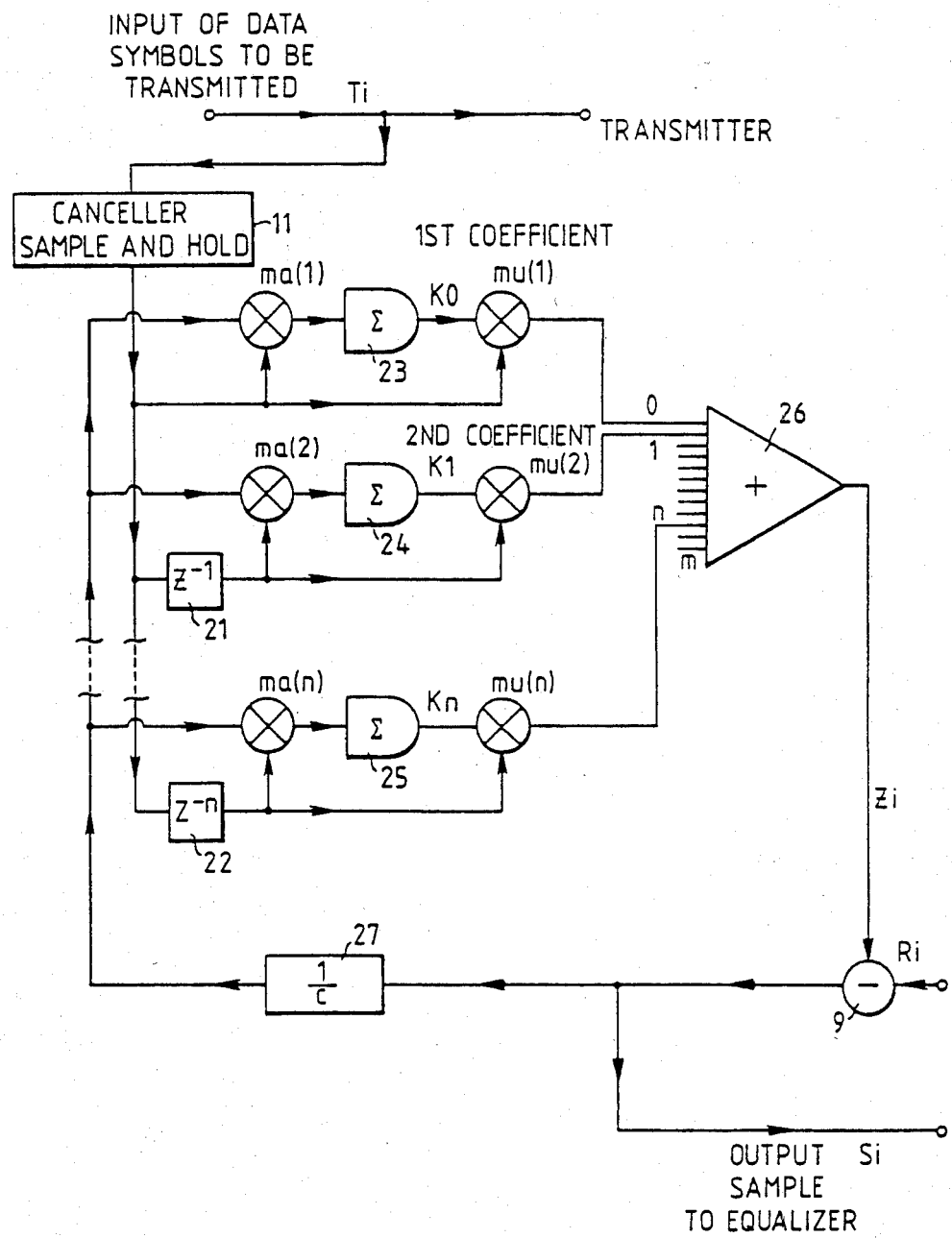
FIG. 2 is a function diagram of an echo canceller arrangement usable to connect the scrambler and the subtractor in FIG. 1.

FIG. 2 shows the echo canceller, which includes the echo simulator (12, FIG. 1), which is fed by the sample and hold circuit 11 and which feeds the subtractor 9 at which echo cancellation takes place.

Let the transhybrid impulse response (TIR) be g(t) and the sampled transhybrid response $G_i$. With a transmitted impulse sequence $T_i$, the hybrid output consists of the convolution of the transmitted symbols with the TIR, plus the far-end transmission $F_i$ and an external noise component $N_i$ $$R_i = \sum_{j=o}^{\infty} G_j T_{i-j} + F_i + N_i \quad (1)$$

The echo simulator (12, FIG. 1) is an adaptive transversal filter having (m+1) coefficients, and consists of m symbol delay elements such as 21, 22, and (m+1) accumulators formed by the elements 23, 24, 25 which store the coefficient values, with two multipliers such as ma(1) and mu(1) per coefficient. The current transmitted symbol value $T_i$ and the previous m transmitted symbol values are multiplied by the accumulator values $K_i$ using the multipliers mu(1) to mu(m) to form an estimate of the transhybrid signal component of the signal $Z_i$.

$$Z_i = \sum_{j=o}^{m} K_j T_{i-j} \quad (2)$$

The difference signal between the sampled input signal $R_i$ and the echo simulator estimate $Z_i$ is $S_i$:

$$S_i = R_i - Z_i \sum_{j=o}^{m} T_{i-j}(G_j - K_j) + \sum_{m+1}^{\infty} G_j T_{i-j} + F_i + N_i$$

The difference signal derived from the output of the subtractor 9, is scaled by a factor $1/C$, in an error scaler 27, and used to increment each accumulator after correlations with the corresponding symbol value using multipliers ma(1) to ma(m). The new coefficient value $K_n$ is then $$K_n = K_n + \frac{S_i}{C} \cdot T_{i-n} \quad (4)$$

Thus the output (a) being the difference signal (Si) between the echo simulator output Zi and the received sampled input values Ri in the RETURN path, goes to the equiliser (14, FIG. 1).

Figure 3:
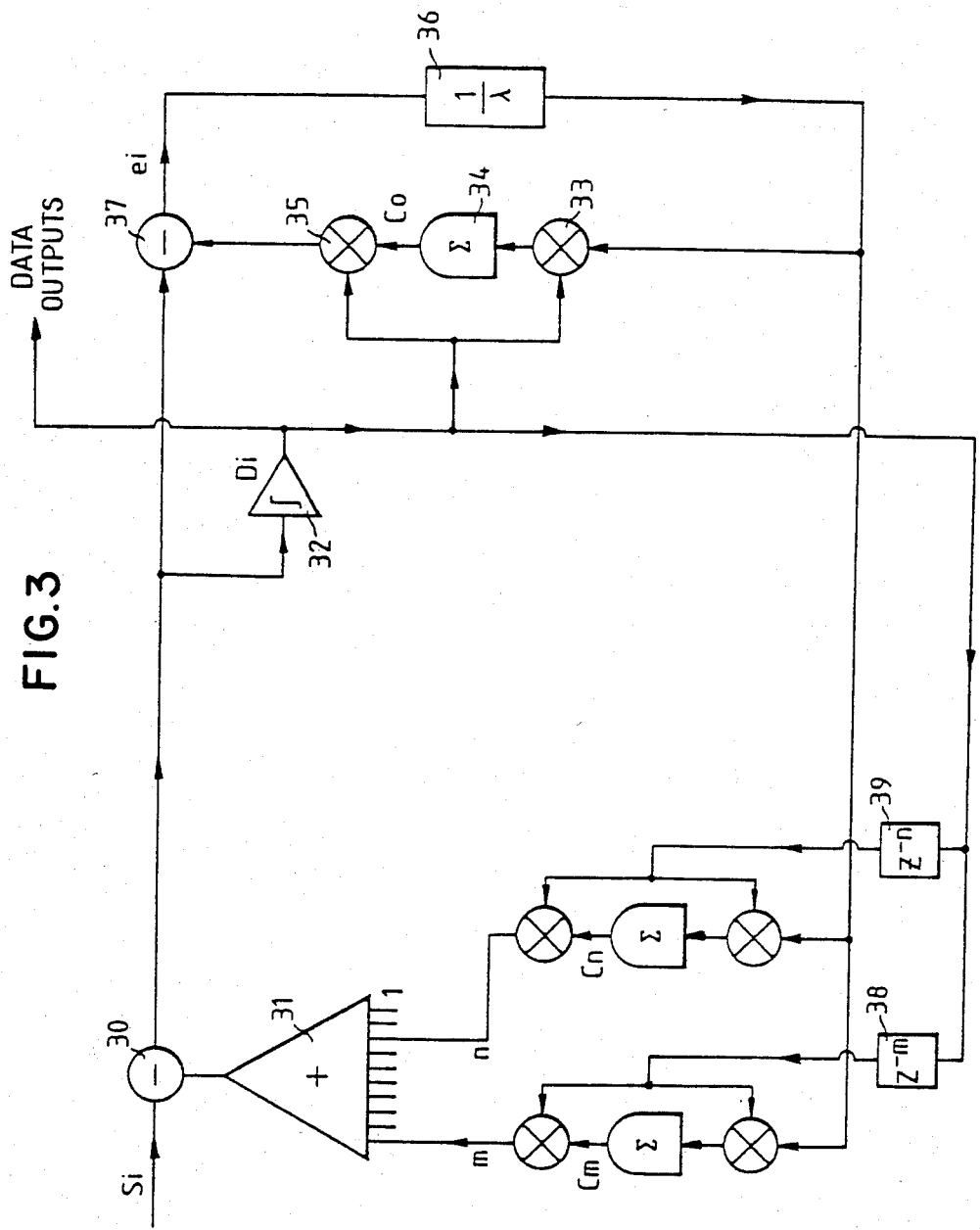
FIG. 3 is a functional diagram of an adaptive decision feedback equalizer (ADFE) usable in FIG. 1.

The system is based on an ADFE, FIG. 3 operating on the echo cancelled output which is samples spaced by one symbol period. In describing this equalizer we assume that any content of the local signal superimposed on the wanted far-end signal is totally removed by the echo canceller.

The function of the ADFE is to remove ISI at the decision point by subtraction just before the decision point. FIG. 3 represents the operation of the ADFE. The impulse responses (TIR) must have a rise time to maximum or near maximum value at most equal to the time between successive transmitted symbols. The first clearly-defined maximum of the impulse response for a given set of symbol spaced samples is called the cursor value of the response. The channel is assumed to be linear in that the superposition principle applies throughout from transmitter to receiver. Note that the sequence-dependent equalization may be used to overcome certain types of non-linearity. It is also assumed that after a finite time, the summation of all unsigned values of the impulse response is finite and less than the cursor value, such that a finite length equalizer may be used.

We now describe the operation of the equalizer, FIG. 3. The samples input signal $S_i$ has subtracted from it by a subtractor 30 an estimate of the ISI at that sample time formed by adding the ISI due to previous symbols. The nth constituent of the sum, produced by the adder 31, is formed by the product of the nth previous decision value, and the nth post cursor unit symbol time response estimate. The decision value from the current sample is $D_i$, that for the nth previous sample is $D_{i-n}$, and the estimated value of the unit symbol time response at time t due to a symbol received at $t_{i-n}$ is $C_n$. This estimate is the coefficient value, so the estimate of ISI due to each previously received symbol at $t_{i-n}$ is $D_{i-n}C_n$.

The sampled value free of estimated post cursor ISI is passed to the threshold detector 32, which determines the symbol value. The value on which the decision due to the sample $S_i$ is made is thus $$d_i = S_i - \sum_{n=1}^{m} D_{i-n} C_n \quad (5)$$

The decision value ($D_i$) is then multiplied using element 35 by a cursor coefficient estimate $C_o$, which is the value of the accumulator element 34. This product is then subtracted by a subtractor 37 from the value at the input of the detector 32, and is termed the error value. Thus the error value is formed by the following calculation:

$$e_i = S_i - \sum_{n=o}^{m} D_{i-n} C_n \quad (6)$$

The error estimate is used to update the coefficient values $C_o$ to $C_n$. Each coefficient is then incremented by the product of the error value scaled by element 36 and the symbol value used to form the product with that coefficient in deriving the error value. Thus the new value of the nth coefficient $C_n^1$ becomes $$C_n^1 = C + \frac{e_i}{\lambda} \cdot D_{i-n} \quad (7)$$

The next sample is taken and all previous detected symbols shifted one cell through the memory. Such an equalizer is described in more detail in our above-mentioned Application No. 8032249 (D. A. Fisher 2)

Figure 4:
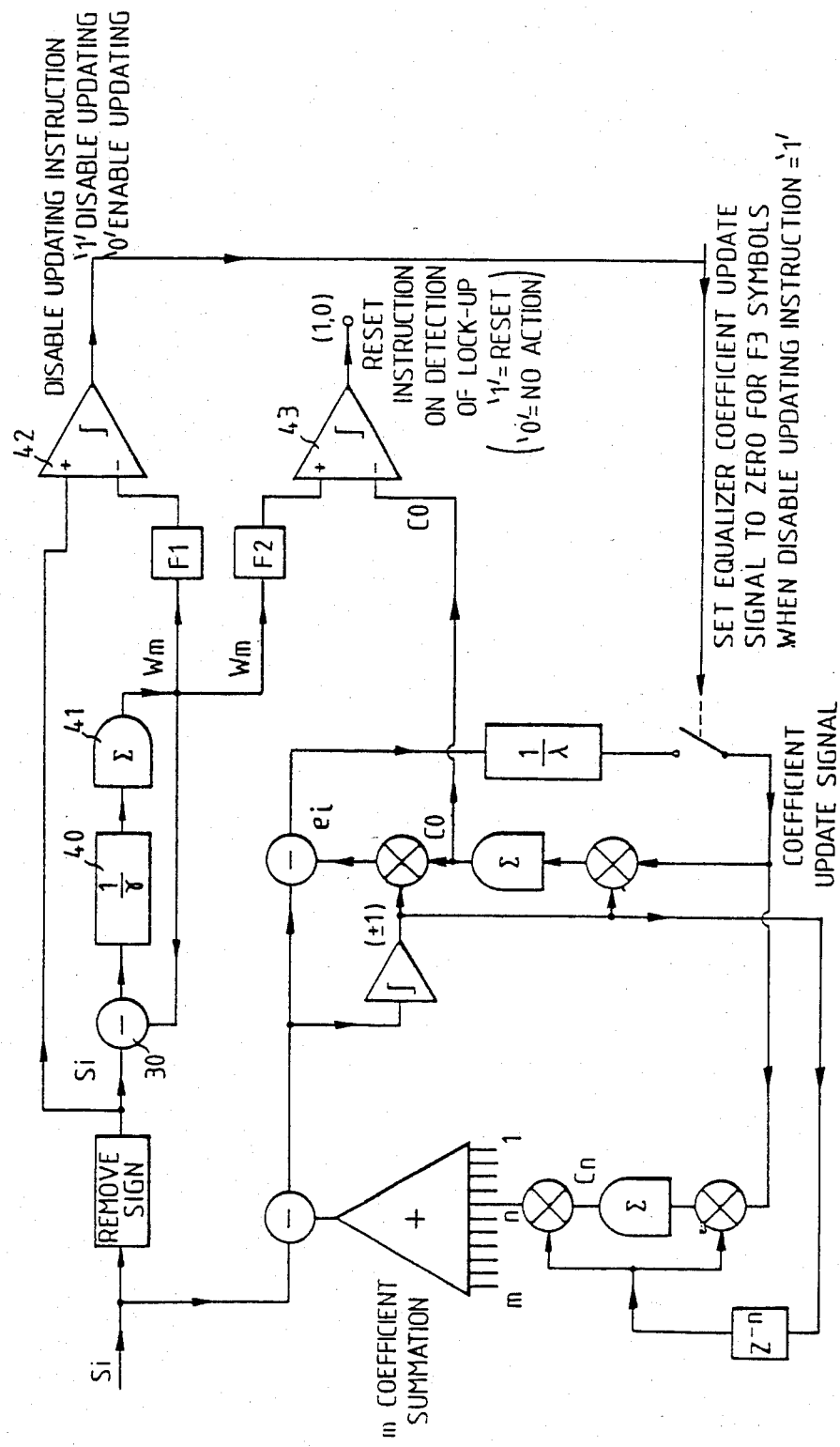
FIG. 4 is a functional diagram of an ADFE, similar to that of FIG. 3 but with transient and lock up protection.

There are two more features of the ADFE, one being the provision of transient and lock-up protection while the other generates a signal for sampling time control, and FIG. 4 shows additions to the ADFE for disabling the coefficient values when a large transient is detected at the input, and for detecting the state which can occur when the equalizer is in a stable but invalid operating state.

A weighted running mean $W_m$ is produced by the subtractor 30, scaling circuit 40 and accumulator 41. The coefficient updating is disabled for F3 symbols, via a threshold detector 42 if the ratio of the magnitude of the input sample value to the mean value $S_i/W_m$ exceeds F1. The weighted running mean $W_m$ is also used to detect lock-up by comparison in a threshold device 43 with the value of the ADFE cursor value $C_o$, which is always positive. If the ratio of $C_o/W_m > F2$, the coefficients are set to zero as can be seen in FIG. 4.

With binary and ternary systems a preferred set of values is F1=2, F2=2 and F3=4.

We now consider timing extracting. The slave end extraction is controlled by defining specific ratios between symbol spaced values of the overall transmission impulse response between the transmitter and receiver. The sampling time is adjusted until these conditions are met. The required correlation ratios may be varied according to other criteria to maintain an optimum sampling instant under differing conditions. The absolute value of the weighted running mean $W_m$ is used for this purpose.

Figure 5:
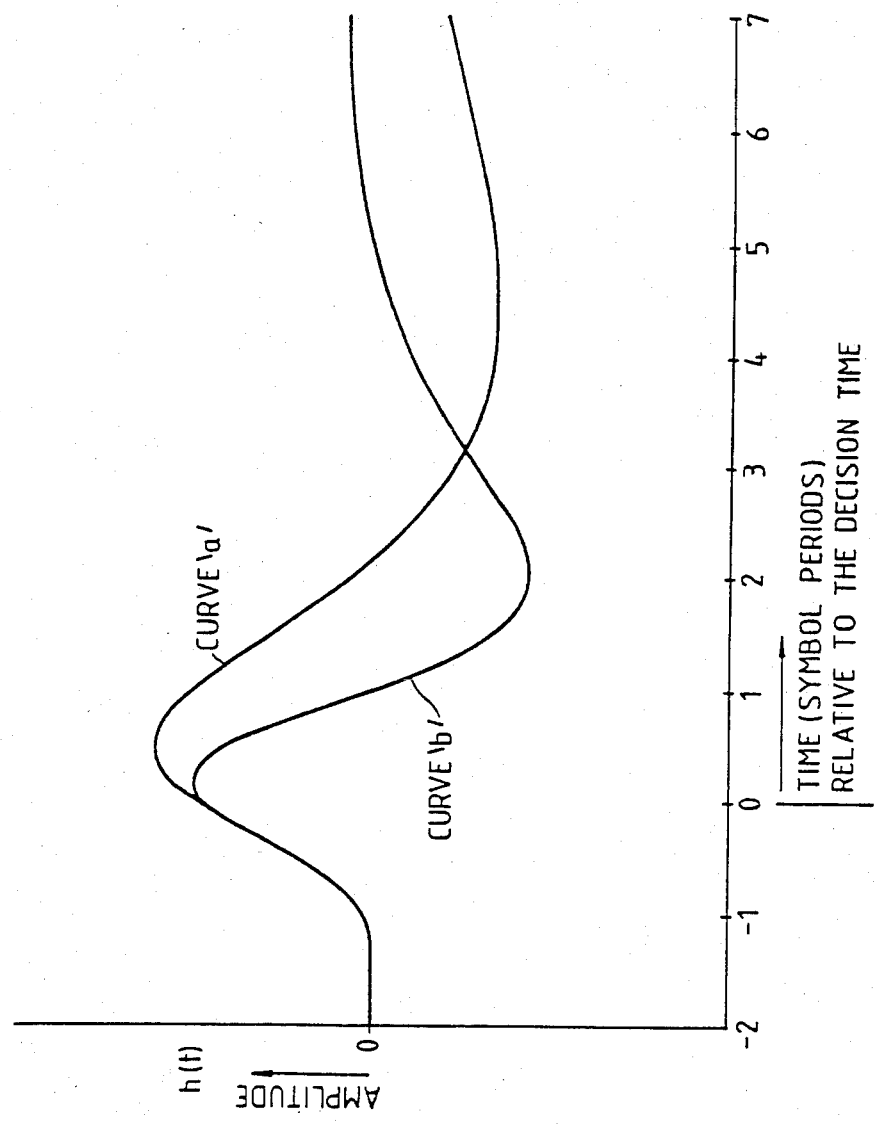
FIG. 5 is a graph of channel impulse response, useful in explaining the invention.

Consider the impulse response defined in FIG. 5 curve 'a' as seen at the input to the equalizer 14, FIG. 1. This is due to the transmitter pulse shaping, the transmit filter 3, FIG. 1, transmission through the line hybrid, 4, transmission through the line transformers and cable and the low-pass band-limiting filter 7. The analog to digital conversion is in this case assumed to give a true sample of the instantaneous signal value as a number. The digital filter 10, FIG. 1 is not included. Given such an impulse response a discriminator characteristic may be obtained from the continuous estimates of the channel impulse response available within the ADFE. The discriminator characteristics may be obtained by a combination of operations on the coefficient estimates and on the signal thereof.

Figure 6:
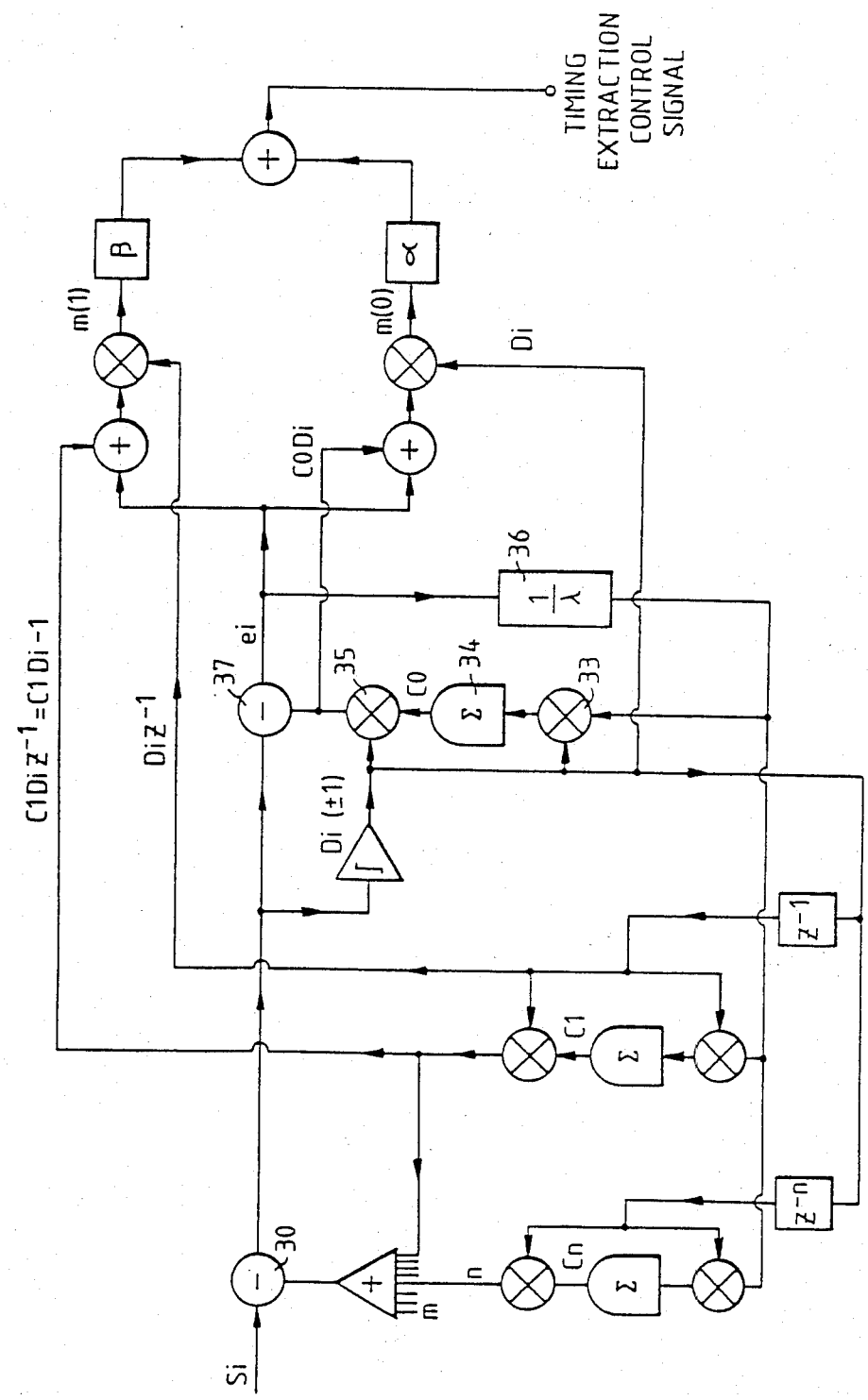
FIG. 6 is a functional diagram of an ADFE with means to generate a timing extraction control signal.

For the channel response of curve 'a' FIG. 5, the system diagram of FIG. 6 defines the operations needed to derive a signal to control a phase locked loop directly from the coefficients. FIG. 6 relates to the ADFE with means to produce an estimate of a control signal generated for timing extraction control. Here the time constants for control of the sampling control loop may be chosen separately from the integration constants of the equalizer proper.

The function of the system of FIG. 6 is to produce the value $\alpha h(o) + \beta h(1)$ and the signal is then used to control a phase-locked loop or a switched phase adjustment, as described below.

The basic structure and operation of the ADFE is as described above, see FIG. 3. The two values needed in this case are referred to as independent estimates of the cursor value and the first post-cursor value. Each is formed as follows. The error signal $e_i$ which comes from the subtractor 37 is the remainder of the sampled input signal after the cursor and all post-cursor estimates of the sequence of transmitted symbols convolved with the transmission channel have been removed.

An estimate of the value of the cursor coefficient $C_o$ is formed by the loop consisting of the symbol value and coefficient accumulator multiplier 35, the subtraction of the cursor content of the signal by the subtractor 37, the scaling function 36, and the correlation formed by the multiplier and accumulator 33, 34. However, the loop integration time is controlled by the value of $\lambda$ which is the loop gain.

To generate an estimate free from this constraint the value $D_i$ times $C_o$ is added back into the error signal $e_i$ and the product of this modified remainder with the appropriate decision value is used for timing control. This is called a modified channel estimate, $M(n)$ corresponding to the channel impulse response $h(t=n)$ being n symbol periods after the decision point. Independent estimates of any post-cursor value may similarly be obtained. These may then be scaled and added or subtracted to give the control signal. The coefficients themselves may be directly used if the inherent integration time constants defined by $\lambda$ are suitable.

Referring to the channel response curve 'a' FIG. 5, this is typical of those encountered on twisted-pair transmission lines as used in the local telephone subscriber network. If the sampling time is adjusted until the difference between the channel impulse response estimate at $h(t=o)$ and $h(t=1)$ (t relative to the decision point) is zero, then the value of $C_o$ (being the equalizer estimate of the channel impulse response at the decision time) is near the first peak of the impulse. The conditions previously mentioned for correct operation of the ADFE are then satisfied. The difference between samples taken at unit symbol intervals as the sampling time is varied is given by curve 'b' of FIG. 5. Note that for this channel response, $h(t) - h(t+1)$ is free from inflexion for a third of a symbol period either side of the zero crossing and thus provides a clean signal for timing control.

An alternative giving the same sampling time as forcing the estimate of $h(t=0) - h(t=1)$ to zero is to place a digital filter with response $(1-Z^1)$ in the signal path, e.g. in position 10, FIG. 1, constructed by a symbol period delay element and a subtractor. Then the result on the overall transmission impulse response FIG. 5, curve 'a' is as given in FIG. 5 curve 'b'. In this case the forcing of $h(t=1)$ to zero alone can be used to control the timing circuits.

A preferred implementation of this method of timing extraction uses both digital filtering of the channel and a switched operation on the estimates of $h(t=0)$ and $h(t=1)$ to generate the timing loop control signal. The filter 7, FIG. 1 in this implementation is specifically $1-Z^{-1}$ and the weighted running mean is used as a switch to control whether the $h(t=1)$ estimate alone or $2h(t=0) + 3h(t=1)$ is used (for short cables) to control the sampling times. Hysteresis is added to the switch acting on $W_m$ by having a higher threshold for switching from the $2h(t=0) + 3h(t=1)$ controlled state to the $h(t=1)$ controlled state than in the opposite direction. A particular feature of this operation is that it introduces no discontinuity in correct operation of the system.

Four methods of application of the timing control signal generated by one of the methods described above to control the receiver sampling time are described. The function of these methods is to so alter the receiver sampling time that a predetermined weighted sum of the channel response estimates is reduced to zero. At the slave end the transmit time tracks the sampling time so that the coefficients of the echo simulator remain constant as the sampling time is changed.

Figure 7:
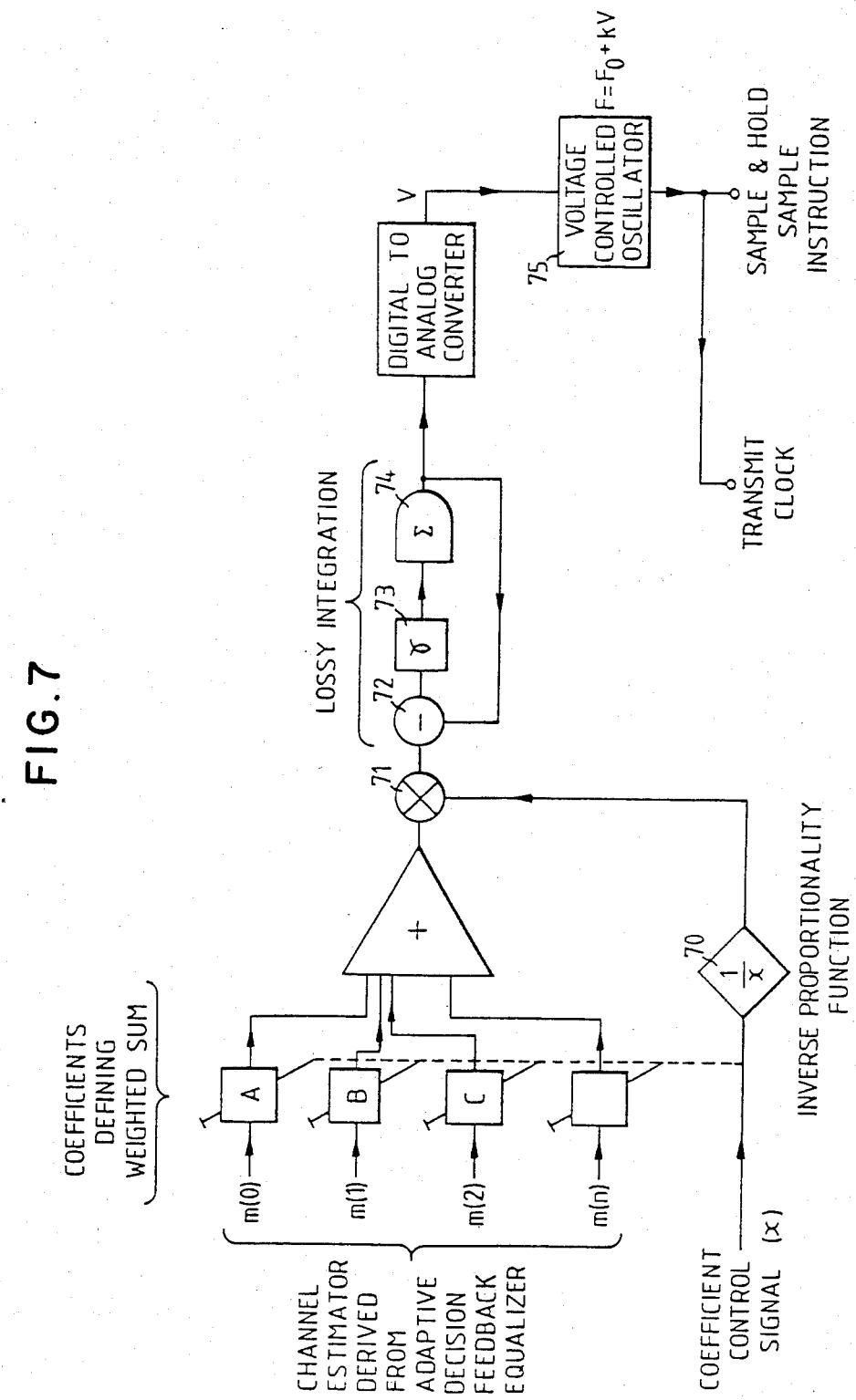
FIG. 7 is a diagram explanatory of sample and hold control at a slave end.

The most general system is given in FIG. 7. Here a weighted sum of the channel estimates M(0) to M(n) is formed which is to be zero-forced. The use of a coefficient control signal (X) to control the coefficients of the weighted sum either continuously or in steps enables the system to be adapted to suit different channel characteristics. Thus both the values previously defined as $W_m$ and $C_o$ are indicators of the magnitude of the signal which for a cable may be used to adjust to a predictable sampling time optimum. In addition to adjusting the actual sampling time instant, the loop gain of the phase-locked loop may also be adjusted to compensate for a reduced input signal amplitude. This uses element 70, which generates an inverse proportionality function, and by increasing the output of the weighted summation in inverse proportion of the signal magnitude indicator X. The lossy integrator 72, 73, 74, with integration scaling constant $\gamma$, provides a steady control voltage for the VCO 75 after the digital to analog conversion.

In a second implementation the coefficient estimates available from the accumulator outputs are used directly. The function $$f(A^*C_o + B^*C_1 + C^*C_2 + \ldots)$$

is performed digitally and the sign of the result used directly to control the VCO such that if the sign is +ve then the VCO is set to its maximum frequency, while if the sign is −ve the VCO is set to its minimum frequency. In this implementation which gives a first order control loop, the VCO range must be limited. The system operates satisfactorily with an oscillator range of up to ±1000 parts per million.

In a third implementation the modified channel estimates M(n) as defined above are used. The predetermined function $$F(A^*M(0) + B^*M(1) + C^*M(2) + \ldots)$$

is performed digitally and the sign of the result is used to interface to analog circuitry. An analog integrator then precedes the VCO, the time constants of the integrator and VCO being chosen to match the system requirements.

A fourth implementation of the slave end timing control uses a digital phase locked loop, and the circuit is similar to that to be described for the master end timing extraction. The difference is that the canceller sample and hold, the receiver sample and hold and the transmitter symbol clock are all operated in synchronism and the phase of all three are simultaneously advanced or retarded in small steps with respect to a fixed crystal oscillator reference clock nominally of frequency equal to the master clock at the master end. The following description may thus be applied to the slave end by considering these three synchronous clocks to be controlled from the receiver sampling clock. Further by virtue of the echo canceller being in synchronism with the receiver sampling clock, transferable echo canceller coefficients are not required, and the waiting period between phase steps can be shortened.

Figure 8:
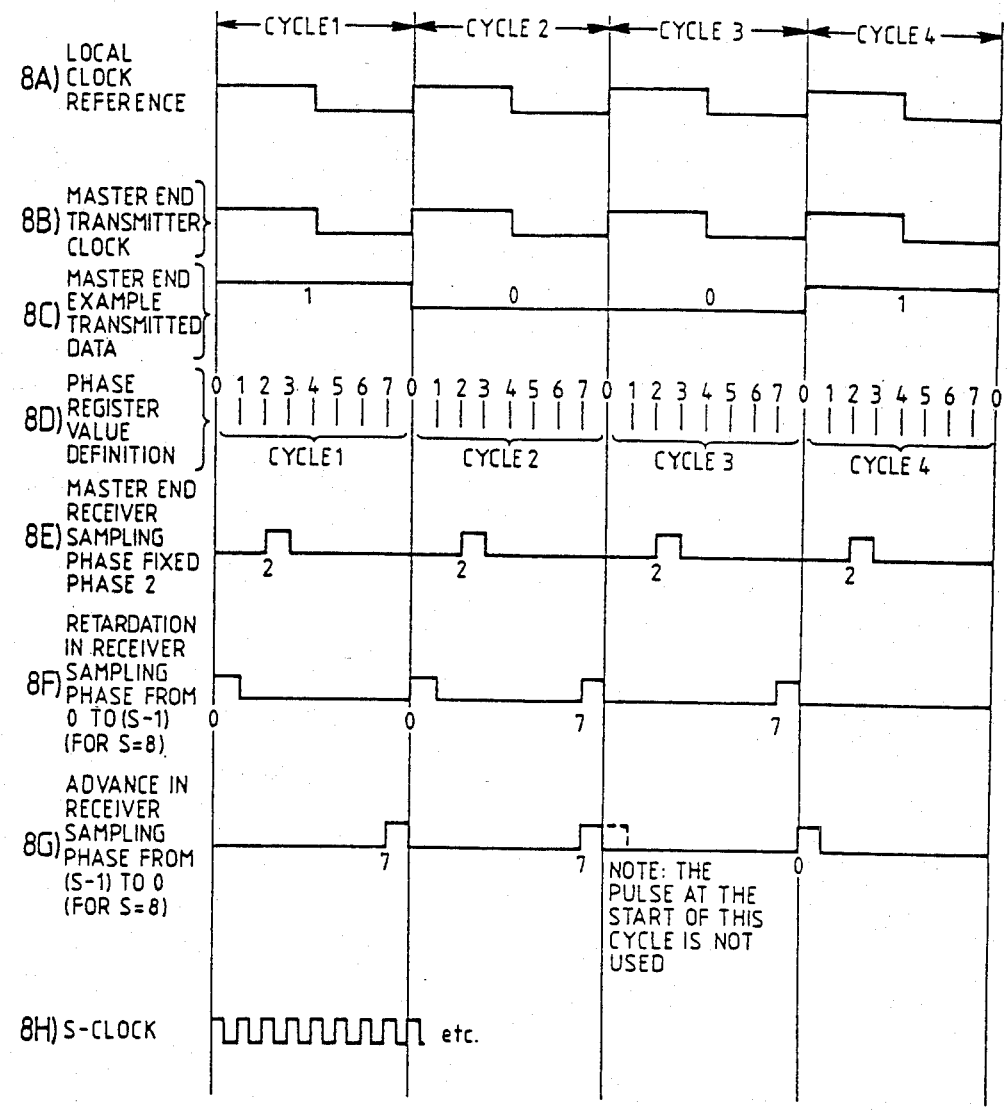
FIG. 8 shows sampling phase clock diagrams.

The master end of the system is the end with the reference clock, which for an exchange to subscriber loop is the exchange end. The control signals used may be derived as described above. Only the sign of the resultant signal is important, as the adjustment is a single step forwards or backwards in time with respect to the nominal symbol interval. Referring to FIG. 8 at the master end the transmitter clock is locked to the local clock reference and the sample instruction is adjusted in small steps, there being S steps in a symbol period.

To enable a continuous incremental advance or retardation of the sampling time with respect to one symbol interval, a "fold-around" technique is used in the controlling circuitry. At the master end this involves an alteration to the echo canceller so that at the "fold-around" boundary there is no discontinuity of operation. Operation of the timing may be explained with reference to FIGS. 8 and 9.

The sampling time is adjusted with respect to a reference point, which is the local reference clock FIG. 8(a). The sampling time can only change by one step at a time, and two methods which limit the frequency with which steps can occur and which allow the canceller coefficients to adapt to the new sampling time and consequent change in the sampled trans-hybrid symbol impulse response are described. The step size is a fraction of a symbol period so that the change in the trans-hybrid impulse response is limited and does not cause an error.

The symbol transmit clock is split into S steps such that the receiver sample and hold clock is adjustable to any position between 0 and S−1 by the control circuitry. The receiver sampling time is controlled from a register which defines the current position of the sampling time in terms of the number of steps from the transmit symbol clock; this phase register value corresponds to the receiver sampling phase. Sampling phase 0 corresponds to no time difference between the local clock reference and the receiver sampling clock. In FIG. 8, the local clock reference is defined in FIG. 8(a), and all other clocks are referred to this reference. For s=8, the phase register values are defined in FIG. 8(d). FIG. 8(e) defines the relationship between the local clock reference and the receiver sampling clocks when the receiver sampling phase is 2 and the number of steps (S)=8. The 0 to 1 transition of the clock is taken to be the edge upon which data is moved into and out of the clocked device.

When the receiver timing control requires the sampling time to be advanced, the sampling phase controlling register content is reduced by one. If the sampling phase is at position 0, the register value and corresponding sampling phase is changed to value S−1. The timing diagram for the change is given in FIG. 8(f) and it is important to note that two receiver samples occur during the transmission cycle 2.

When the receiver timing control needs the sampling time to be retarded the content of the sampling phase control register, and thus the corresponding sampling phase is increased by one. If this phase is at S−1, the phase register value is changed from S−1 to 0. The timing diagram for the change is given in FIG. 8(g); note that in this transition the change in sampling time omits the sample at sampling phase 0 in the transmission cycle immediately following the S−1 sample. This causes the complete omission from this transmit clock cycle (cycle 3 in FIG. 8(g)) of a receiver sample.

To limit the frequency of the step change in sampling time, we describe two methods. As stated above, only the sign of the timing control signal is used to adjust the digital phase locked loop, this signal being subject to change after each symbol period.

The first method of limiting the step frequency is to latch the phase register every pth symbol, depending on the sign of the control signal. In the second method, the control signal is fed to an up/down counter which is incremented or decremented during each symbol period. When the up/down counter reaches its limit L and is further incremented, it is reset to zero and increments the phase register. Conversely when the up/down counter is at value zero and is further decremented, the phase register is then decremented, and the up/down counter is set to value L.

Figure 9:
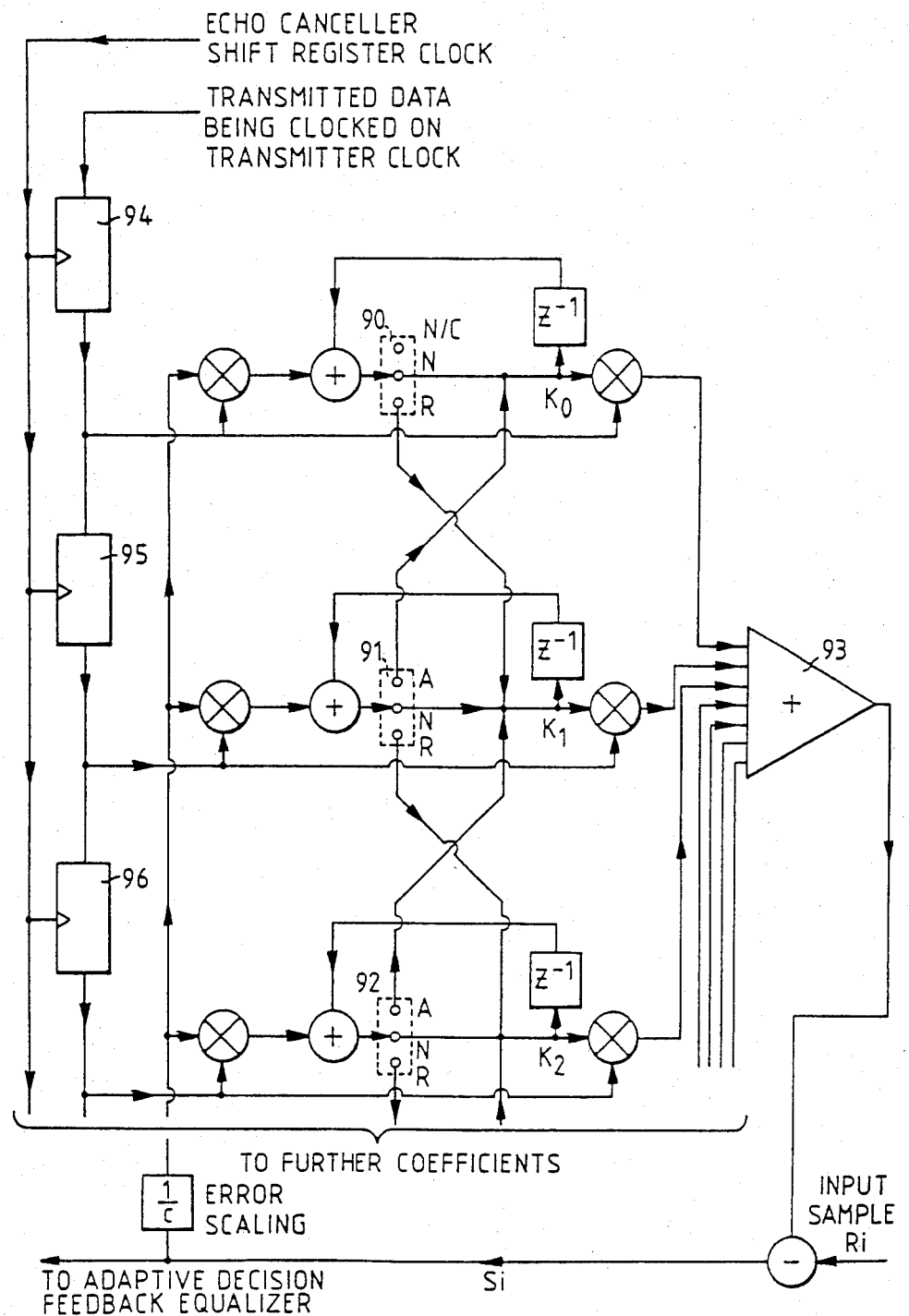
FIG. 9 is a functional diagram of an echo canceller with transferable coefficients.

The echo canceller sample and hold clock is also controlled by the sampling phase circuitry. As the echo simulating filter is an adaptive transversal filter operating on the transmitted data, its output, is synchronous with the receiver sample and hold clock. In FIGS. 8(f) and 8(g) it may be seen that there is a slip between the transmitted data and the receiver sample time such that if the receiver sample and hold clock is used to clock data into the echo canceller, a discontinuity of operation would occur when the sampling phase changes from 0 to S−1 and vice-versa. This is overcome by altering the echo simulator as shown in FIG. 9.

The simulation filter is altered in two ways. Firstly the accumulators are linked so that the coefficient values may be shifted forward or backward. Secondly, the clocking of the transmitted data into the symbol shift register prior to multiplication by the accumulator values may be altered to allow for the receiver timing phase changes across the 0 to S−1 boundary and vice-versa.

The sequence of operation for an advance in sampling time corresponding to a change in the sampling phase register value from 0 to S−1 is as follows. The symbol shift register is not clocked. The multiplexers 90, 91, 92 steering the coefficient values are set to the advance state "A" so that the coefficient value operated on by the input data is shifted back one position through the adaptive filter. The sum of products is formed in the usual way as explained above, using the adder 93 and the algorithm presented. Following the updating, the multiplexers are returned to the normal state ("N") and operation continues as above. The net result of this cycle has been to transfer the coefficients back through the adaptive filter by one position.

The sequence of operation for a retard transition in sampling time from a sampling phase S−1 to a sampling phase 0 is as follows. The symbol shift register 94-95-96 is clocked twice. The first symbol register clock pulse is timed to coincide with sampling pulse 0 immediately following the transmit clock which is specifically not used to clock the receiver sample and hold as previously mentioned. This is shown dotted in FIG. 8(g). The second shift register pulse is generated at the same time as the receiver sampling time.

A preferred implementation of the digital phase locked loop in particular where the number of steps (S) and the capacity (L) of the prescaling up/down counter are integral powers of 2, is to use an up/down counter of length $\log_2(L+S)=[s+1]$ as a combined phase register and prescaler. $\log_2(x)$ is defined as the logarithm to the base 2 of x. The S most significant bits of the up/down counter thus represent the phase register value and the remaining least significant bits from the prescaling accumulator. During each symbol period the up/down counter is incremented or decremented depending on the sign of the timing control signal derived directly from the coefficient values using the preferred ratios described above. A suitable value for the number of steps S at both slave and master ends is 128 (s=6); at the master end a value of L of 256 gives satisfactory operation whilst at the slave end the value of L=128 (l=6) gives satisfactory operation whilst enabling a maximum offset between the local clock references at the slave and master ends of $\pm 10^6/(L*S)=(\pm 61)$ parts per million.

On the local reference clock (LRC) edge a down counter which has previously been loaded to the value of the phase register commences counting down to zero at a rate S times the LRC; the LRC being derived from an exact sub-multiple of the S clock.

On reaching zero the down counter outputs a pulse which is used as the receiver sample clock. This pulse is also used to automatically reset the down counter to the value stored in the phase register. The system is designed so that it will ignore any commence count instruction from the LRC which occurs less than two S clock intervals after the down counter reaches zero.

We now consider the extension of the system to enable transmission and detection of ternary data, as follows. The preferred code encodes 3 binary digits as two ternary digitsl (3B2T). The code word table is defined below.

| BINARY WORD | TERNARY WORD | BINARY WORD | TERNARY WORD |
|---|---|---|---|
| 0 000 | 00 | 4 100 | 12 |
| 1 001 | 01 | 5 101 | 20 |
| 2 010 | 02 | 6 110 | 21 |
| 3 011 | 10 | 7 111 | 22 |

The ternary code word 11 is not used, which enables code word synchronisation by recognition of the word violation 11. For a data format in 18 bit frames, the ternary frame size is 12 symbols. A method of frame synchronisation is used for which at every 8th ternary frame, the ternary word 1111 is added, which enables frame synchronization. A second implementation is the addition of the 111 ternary code word every sixth ternary frame. The increase in ternary symbol rate in both cases is 100/96.

A preferred method of transmission is to use transmission potentials of −V,0 and +V volts, corresponding to the ternary symbol values 0,1 and 2 respectively. Operation of the echo canceller is exactly as previously described the symbol registers however containing three level symbol values −1,0 and +1. The decision feedback equalizer operation is similarly altered. In addition a three level detection process is employed in which the comparator function defined in FIG. 3 is expanded to cater for the ternary transmission code as follows:

| Input value | Output ternary symbol value |
|---|---|
| X > C(O)/2 | +1 |
| −C(O)/2 < X < C(O)/2 | 0 |
| X < C(O)/2 | −1 |

Two methods for monitoring the in-service system error rate without introducing additional code redundancy are described which may be used separately or in combination. The first method is only applicable to the ternary system or a similarly coded system, the important property of which is the use of a restricted set of code words in which the occurrence of certain code words may be seen to be a code violation. In the case of the 3B2T code described, the code word 11 is used for word synchronization. Thus once word synchronization has been achieved the occurrence of the code word 11, except as part of the frame synchronization word 1111 may be interpreted as an error indicator, and the frequency of this violation used as a measure of error rate. The confidence limit to which an error rate may be measured using this approach depends on the ratio of word violations to the permitted symbol sequence 11 which may straddle two code words and is used for word synchronization. As this limit is approached the word synchronization may at a particular threshold be considered lost, and thus operate an alarm if not regained. In this system, the inability to define word synchronization as described above may also be used to reset the coefficients of the echo canceller and the equaliser adaptive filters to zero, interpreting the word synchronization loss as the result of system lock-up.

The second method of error detection uses the estimation of the eye height given by the coefficient $C_o$ and the error estimate e defined in the equaliser description in the preceeding text, both of which are available and updated for each symbol received. The difference signal between the magnitude of $C_o$ and the magnitude of a scaled value of the error signal may be used as an indicator of the error rate of the system. Thus if the following expression is negative a 1 is output, if positive a 0 is output.

$$C_o - k^* e_i$$

A similar scheme has been described in Application No. 8032249 (D. A. Fisher −2) for the control of receiver sampling phase. In the case of the system described above, the value of scaling constant $k=1$ yields close to a one-to-one ratio of error perceived to true symbol error. The estimate of error rate for the case $k=1$ is thus obtained by counting the number of 1's output from the difference calculating circuit. An alarm signal is enabled when the total exceeds an acceptable level. A continuous method of doing this is to use an up/down counter which is incremented for every perceived error, and decremented every Gth symbol. To detect a perceived error rate exceeding the inverse of G, a threshold on the up/down counter is set which if exceeded causes an alarm signal to be activated. The higher the threshold is set the longer the period the error rate defined by G must be sustained before the alarm is given, thus giving an temporal averaging mechanism. A more immediate and complex extension of the same principle is to set the error scaling (k) in the $(C_o - K^* e_i)$ calculation greater than unity. This results in a more frequent negative result being output, each count representing a certain fraction of an error which is dependent on the value of k and on the error statistics. An averaging and alarm system using an up/down counter as described above, the decrementation interval G and the alarm threshold being chosen subject to the required system error performance. It is to be noted that throughout this text the symbol * represents multiplication.

An alternative measure of system performance may be obtained by calculating the running means of the difference in magnitudes between the cursor coefficient value and the error signal $e_i$, which gives an absolute measure of the mean margin against noise.

I claim:

1. In a communications system in which digital information such as PCM data signals having a given symbol rate are conveyed over a two wire circuit, with said two wire circuit coupled to an input of a line hybrid, with said hybrid providing at one output a transmission channel port for transmitting data to said two wire line and at another output a receiving channel port for receiving data representing data symbols from said two wire line, said system undesirably including due to imperfection in said hybrid unwanted echo signals due to undesired coupling between said transmitting and receiving channels, the combination therewith of apparatus for cancelling said unwanted echo signals, comprising:

analog to digital converter means having an input coupled to said receiving channel port for providing at an output a digital signal for each received data symbol and having a control input to provide said digital signal indicative of said received data symbol at a specific timing interval, a digital filter having a transform selected to provide a filtered response at an output according to $(1-Z^{-1})$ and having an input coupled to the output of said analog to digital converter, a subtractor circuit having a first input coupled to the output of said digital filter, a sample and hold circuit means having an input coupled to said transmission port of said hybrid and having an output, a digital adaptive echo simulator having an input coupled to the output of said sample and hold circuit with an output coupled to a second input of said subtractor circuit, said echo simulator incuding a transversel filter having variable coefficient capability and which filter includes plurality of coefficient generators for generating filter coefficients at given delays, with said delay of each generator controlled by an associated multiplexer for each coefficient generator, an adaptive descision feedback equalizer means having an input coupled to the output of said subtractor circuit for providing at an output a timing signal indicative of the timing of the received data symbols as applied to said subtractor and as modified by said adaptive echo simulator said equalizer including means for continuously estimating the impulse response at said receiving channel port based on said timing signal, a timing extraction controller having an input coupled to said feedback equalizer and responsive to said timing signal for providing at an output a control signal which output is coupled to said control input of said analog to digital converter, whereby said analog to digital converter is forced to provide said digital output signal according to said control signal from said equalizer to thereby cause said output of said subtractor to provide a version of said received signal from which said unwanted signals have been substantially removed.

2. The communications system combination according to claim 1 further including a transmit filter coupled between said transmission channel port of said hybrid and said input of said canceller sample and hold circuit.

3. The communications system combination according to claim 1, further including an input terminal associated with said input of said canceller sample and hold circuit with said terminal coupled to the input of a scrambler for eliminating auto correlation in data applied to said input terminal for transmission to said transmitting port of said hybrid with the output of said scrambler coupled to the input of an encoder having an output coupled to said input of said canceller sample and hold circuit.

4. The communications system combination according to claim 3, wherein said adaptive decision feedback equalizer has a further output coupled to the input of a decoder for decoding said received signals at an output and a descrambler having an input coupled to the output of said decoder with an output coupled to an output terminal for providing an unscrambled replica of said received signal.

5. The communications system combination according to claim 1 wherein said digital adaptive echo simulator has a control input coupled to the output of said subtractor, with said control input for controlling the timing of said trasversal filter according to the timing as applied to said control input of said analog to digital convertor, whereby said filter provides one output for each input symbol to said analog to digital convertor.

6. The communication system combination according to claim 5, wherein said plurality of coefficient generators for varying said transversal filter coefficients are each coupled to the output of said canceller sample and hold circuit, with each of said coefficient generators adapted to provide at an output a different filter coefficient, with the outputs of said generators coupled to separate input terminals of an adder for providing at an output a summed signal for application to the input of said subtractor.

7. The communications system combination according to claim 6, wherein each of said coefficient generators includes a first multiplier having one input coupled to the output of said canceller sample and hold circuit, and having another input coupled to the output of said subtractor circuit, with the output of said first multiplier connected to the input of an associated accumulator, with the output of each of said associated accumulators coupled to the input of a second associated multiplier, also having an input coupled to said output of said subtractor circuit and with the outputs of said second multipliers coupled to associated inputs of said adder.

8. The communication system combination according to claim 5, wherein each of said coefficient generators is associated with a different given delay with each of said delays being related to the bit rate of said digital information signal.

9. The communication system combination according to claim 4, wherein said adaptive decision feedback equalizer includes an input subtraction circuit having an input coupled to the output of said subtractor circuit, a threshold detector having an input coupled to the output of said input subtraction circuit, with the output of said threshold detector coupled to the input of said decoder, a plurality of coefficient generators coupled to the output of said detector with each of said generators associated with a different bit delay, and with the outputs of said generators coupled to separate inputs of an adder, for providing at an output a summed value of said generator outputs and means for applying said summed value to the other input of said input subtraction circuit to provide at the output of said input subtraction circuit a received signal substantially free of intersymbol interference.

10. The communications system combination according to claim 9, wherein each of said coefficient generators associated with said equalizer includes a first multiplier one input of which is coupled to said threshold detector and having another input, an error estimator circuit responsive to system loop gain for providing at an output a signal dependent upon said loop gain and having said output coupled to the other input of said first multiplier, with the output of said first multiplier applied to the input of an associated accumulator with the output of said accumulator coupled to the input of a second multiplier, with the other input of said second multiplier coupled to the output of said threshold detector, with the output of each of said second multipliers coupled to an associated input of an adder.

11. The communication system combination according to claim 1, further including means coupled to said feedback equalizer for disabling operation of the same for values of input signals which exceed a given threshold with said period of disablement selected according to the magnitude of said signals as exceeding said threshold.

12. The communication system combination according to claim 7, wherein said digital adaptive echo simulator includes a shift register having an input responsive to a transmission timing signal and one input responsive to said timing signal, with the output of said register coupled to the input of said coefficient generators, with each of said coefficient generators further including said multiplexer coupled between said multipliers and said accumulator whereby said register controls said multiplexers to cause said coefficient generators to provide said outputs at given delays according to said shift register outputs to cause said generators to provide said filter coefficients according to said delays whereby the echo cancelling function tracks with no discontinuities.

13. The communications system combination according to claim 1 further including means for monitoring the relation between a cursor coefficient and a coefficient provided by said equalizer to provide an error signal wherein the frequency with which a selected version of said error signal exceeds the cursor coefficient is determined as a measure of the error rate, and wherein the mean magnitude of the different between the cursor coefficient and the error magnitude is used as an absolute measure of the noise margin to provide a control signal for said equalizer.

* * * * *